(12) United States Patent
Cho

(10) Patent No.: US 11,301,166 B2
(45) Date of Patent: Apr. 12, 2022

(54) FLASH STORAGE DEVICE AND OPERATION CONTROL METHOD THEREFOR

(71) Applicant: JM SEMICONDUCTOR, LTD., Hwaseong-si (KR)

(72) Inventor: Wan-Ho Cho, Hwaseong-si (KR)

(73) Assignee: JM SEMICONDUCTOR, LTD., Hwaseong-si (KR)

( * ) Notice: Subject to any disclaimer, the term of this patent is extended or adjusted under 35 U.S.C. 154(b) by 255 days.

(21) Appl. No.: 16/343,492

(22) PCT Filed: Oct. 16, 2017

(86) PCT No.: PCT/KR2017/011373
§ 371 (c)(1),
(2) Date: Apr. 19, 2019

(87) PCT Pub. No.: WO2018/080069
PCT Pub. Date: May 3, 2018

(65) Prior Publication Data
US 2019/0265912 A1    Aug. 29, 2019

(30) Foreign Application Priority Data
Oct. 25, 2016  (KR) .................. 10-2016-0139157

(51) Int. Cl.
*G06F 3/06*      (2006.01)
*G06F 1/28*      (2006.01)
(Continued)

(52) U.S. Cl.
CPC ............ *G06F 3/0659* (2013.01); *G06F 1/165* (2013.01); *G06F 1/266* (2013.01); *G06F 1/28* (2013.01);
(Continued)

(58) Field of Classification Search
CPC ............... G06F 1/00–3296; G06F 3/00; G06F 3/06–0689; G06F 5/00–16;
(Continued)

(56) References Cited

U.S. PATENT DOCUMENTS 5,511,205 A * 4/1996 Kannan ................. G06F 1/30
712/E9.032
5,560,024 A * 9/1996 Harper .................. G06F 1/324
713/322

(Continued)

FOREIGN PATENT DOCUMENTS

AU    718100 B2 *  4/2000  ............ H02J 7/0024
JP    2005-174233    6/2005
(Continued)

OTHER PUBLICATIONS

Definition of AC adapter; Computer Hope; Jun. 13, 2016; retrieved from https://web.archive.org/web/20160613015021/https://www.computerhope.com/jargon/a/acadapte.htm on Mar. 26, 2021 (Year: 2016).*

(Continued)

*Primary Examiner* — Daniel C. Chappell
(74) *Attorney, Agent, or Firm* — Kile Park Reed & Houtteman PLLC

(57) ABSTRACT

The present invention relates to a flash storage device and an operation control method therefor, and when the flash storage device or a mobile terminal on which the flash storage device is mounted is connected to an external power supply, the flash storage device detects and classifies a power supply type, and according to detection and classification information thereof, the reliability and performance of the data of the device can be improved by performing an internal operation thereof.

3 Claims, 4 Drawing Sheets

(51) Int. Cl.
  *G06F 1/16* (2006.01)
  *G06F 1/26* (2006.01)
  *G06F 1/30* (2006.01)
(52) U.S. Cl.
  CPC ............ *G06F 1/305* (2013.01); *G06F 3/0619* (2013.01); *G06F 3/0679* (2013.01)
(58) Field of Classification Search
  CPC ........... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11B 33/00–1493
  See application file for complete search history.

(56) References Cited

U.S. PATENT DOCUMENTS

| | | | | |
|---|---|---|---|---|
| 5,802,379 | A * | 9/1998 | Boatwright | G06F 1/30 713/323 |
| 6,604,199 | B1 * | 8/2003 | Yang | G06F 1/1632 710/303 |
| 7,266,034 | B2 | 9/2007 | Hirai et al. | |
| 7,421,594 | B2 * | 9/2008 | Nakajima | G06F 1/266 320/141 |
| 7,948,356 | B2 * | 5/2011 | Kawamura | H04W 52/0251 340/3.1 |
| 7,962,775 | B1 * | 6/2011 | Vaidyu | G06F 1/3293 713/323 |
| 8,880,775 | B2 | 11/2014 | Stefanus et al. | |
| 9,645,925 | B2 * | 5/2017 | Lee | G06F 12/0253 |
| 9,727,570 | B2 * | 8/2017 | Post | G06F 3/0608 |
| 9,972,275 | B2 * | 5/2018 | Xie | G06F 1/3293 |
| 10,117,185 | B1 * | 10/2018 | Lin | G06F 40/143 |
| 10,355,505 | B2 * | 7/2019 | Montero | G06F 1/28 |
| 10,424,954 | B2 * | 9/2019 | Zhang | H02J 7/0045 |
| 10,680,517 | B1 * | 6/2020 | Qiao | G11C 5/14 |
| 2002/0114184 | A1 * | 8/2002 | Gongwer | G11C 5/14 365/185.11 |
| 2005/0001590 | A1 * | 1/2005 | Bayne | H02J 7/0027 320/128 |
| 2006/0200684 | A1 * | 9/2006 | Bibikar | G06F 1/324 713/300 |
| 2007/0188134 | A1 * | 8/2007 | Hussain | H01M 10/44 320/114 |
| 2008/0072014 | A1 * | 3/2008 | Krishnan | G06F 1/3293 712/43 |
| 2009/0284216 | A1 * | 11/2009 | Bessa | H02J 7/0044 320/101 |
| 2010/0115147 | A1 * | 5/2010 | Kim | G06F 13/10 710/14 |
| 2011/0124375 | A1 * | 5/2011 | Stuivenwold | G06F 1/3203 455/566 |
| 2011/0279078 | A1 * | 11/2011 | Hara | H02J 7/085 320/107 |
| 2011/0309789 | A1 * | 12/2011 | Prasad | H02J 7/00 320/107 |
| 2013/0124888 | A1 * | 5/2013 | Tanaka | G11C 16/06 713/320 |
| 2013/0205075 | A1 | 8/2013 | Twitto et al. | |
| 2014/0084850 | A1 | 3/2014 | Lee et al. | |
| 2014/0344605 | A1 * | 11/2014 | Xie | G06F 1/3293 713/324 |
| 2015/0113214 | A1 * | 4/2015 | Sutardja | G06F 3/0613 711/106 |
| 2015/0169443 | A1 * | 6/2015 | Lee | G06F 12/0246 711/103 |
| 2015/0331624 | A1 * | 11/2015 | Law | G06F 12/0246 711/103 |
| 2016/0225459 | A1 * | 8/2016 | Boysan | G11C 5/14 |
| 2017/0040804 | A1 * | 2/2017 | Hu | H02J 7/007182 |
| 2017/0040812 | A1 * | 2/2017 | Li | H04B 1/3827 |
| 2017/0040814 | A1 * | 2/2017 | Hu | H02J 7/045 |
| 2017/0199824 | A1 * | 7/2017 | Bennatan | G06F 12/0246 |
| 2018/0046844 | A1 * | 2/2018 | Huang | G06K 9/00013 |
| 2018/0217964 | A1 * | 8/2018 | Lin | G06F 1/3203 |

FOREIGN PATENT DOCUMENTS

| | | | |
|---|---|---|---|
| JP | 2005174233 A * | 6/2005 | |
| JP | 2007-48347 | 2/2007 | |
| KR | 10-2013-0089472 | 8/2013 | |
| KR | 10-2014-0039657 | 4/2014 | |
| KR | 10-2015-0068747 | 6/2015 | |

OTHER PUBLICATIONS

AC Line Frequency: Explained So Well it Hertz; ACUPWR; Mar. 9, 2016; retrieved from https://acupwr.com/blogs/news/113860867-ac-line-frequency-explained-so-well-it-hertz on Mar. 26, 2021 (Year: 2016).*
Machine translation of JP 2005-174233; originally published in Japanese on Jun. 30, 2005 (Year: 2005).*
W. Tsai, S. Wu and L. Chang, "Learning-Assisted Write Latency Optimization for Mobile Storage," 2019 IEEE 25th International Conference on Embedded and Real-Time Computing Systems and Applications (RTCSA), 2019, pp. 1-6 (Year: 2019).*
Chin-Hsien Wu, Tei-Wei Kuo and Chia-Lin Yang, "Energy-efficient flash-memory storage systems with an interrupt-emulation mechanism," International Conference on Hardware/Software Codesign and System Synthesis, 2004. CODES+ISSS 2004., 2004, pp. 134-139 (Year: 2004).*
H. Li, C. Yang and H. Tseng, "Energy-Aware Flash Memory Management in Virtual Memory System," in IEEE Transactions on Very Large Scale Integration (VLSI) Systems, vol. 16, No. 8, pp. 952-964, Aug. 2008 (Year: 2008).*
M. Lin and Z. Yao, "Dynamic garbage collection scheme based on past update times for NAND flash-based consumer electronics," in IEEE Transactions on Consumer Electronics, vol. 61, No. 4, pp. 478-483, Nov. 2015 (Year: 2015).*
International Search Report for International Application No. PCT/KR2017/011373, dated Jan. 23, 2018.

* cited by examiner

FLASH STORAGE DEVICE AND OPERATION CONTROL METHOD THEREFOR

TECHNICAL FIELD

The present document relates to a storage device and an operation method thereof, and relates to an operation method of a flash storage device for enhancing data reliability and improving user performance by performing an internal operation depending on an external power connection state or a host connection state.

BACKGROUND ART

Generally, a flash storage or a flash memory refers to a non-volatile storage in which stored information does not disappear even when power is turned off, and has an advantage in that a speed thereof is fast and power consumption thereof is low. The flash storage is classified into two types according to an internal method, which are a NAND type having a large storage capacity and a NOR type having a high processing speed. The NAND type may be highly integrated and may replace a hard disk, and is also suitable for portable devices such as mobile phones, digital cameras, personal digital assistants (PDAs), MP3 players, game devices, digital camcorders, and the like, in which a certain amount of information needs to be stored to perform tasks, thereby being widely used.

The flash storage is also used for a storage such as Universal Serial Bus (USB) memory chips, secure digital (SD) cards, solid-state drives (SSDs), embedded Multi-Media Cards (eMMCs), and Universal Flash Storage (UFS), and may be connected to a host computer to receive power and may allow a user to perform read/write operations through data communication therewith.

Hereinafter, a flash storage device defined herein is a technology related to the above-mentioned storage products, and includes hardware and software. The hardware of the flash storage device includes a first memory (for example, NAND memory) acting as a storage and a control chip (for example, controller), and a second memory (for example, a dynamic random access memory (DRAM)) may be provided according to the type of the flash storage device. The software (firmware) generally resides in the first memory (for example, NAND memory), controls the first memory and the second memory using the control chip to execute external commands (user requests) transmitted through an external interface of the flash storage device, and performs internal operations to manage the first memory that stores data other than the external commands.

The internal operations may be operations autonomously performed to maintain performance of internal devices of the flash storage device and to retain data regardless of the external commands, and rewriting and a garbage collection (GC) for the rewriting may be examples of the internal operations.

Generally, a flash storage device is known as a non-volatile memory that does not lose stored information or data even when power is disconnected, unlike DRAMs. However, electrons may leak in the flash storage device as time passes, which causes degradation of data reliability such as stored information or data being erased or reading/writing not being performed, and this problem may be accelerated by a user's usage pattern and an environment including temperature. In order to solve such a problem, the flash storage device maintains the data reliability by performing internal rewriting operations separated from external commands (user request) using an algorithm implemented by firmware.

Accordingly, since the flash storage device performs the external commands requests) and the internal operations, when the reading/writing of the data is performed by the external commands (user requests), performance of the external commands (user requests) may be degraded depending on whether the internal operations are performed or not.

As a first example, when a user performs a read operation, a flash storage secures data reliability by rewriting data that may cause errors by further reading addresses not selected in addition to user addresses. However, such further reading and rewriting may cause a problem that user performance is degraded.

As a second example, when the flash storage repeatedly rewrites or overwrites, valid and invalid data reside in a NAND, and further writable blocks become insufficient, and thus the flash storage performs a GC that merges the valid data to secure writable blocks, and such a GC, that is, an operation of reclaiming the remaining garbage after files are deleted, may cause a problem that user performance is degraded.

Thus, in the related art, there has been an attempt to solve the problem that read/write processing performance is degraded due to user's requests while internal operations are performed.

The Korean Patent Publication (Publication No. 10-2014-0039657) relates to classifying an operation mode into a first operation mode and a second operation mode according to the magnitude of a voltage supplied to a control unit of a host device and charging a user terminal. Specifically, it is related that when the magnitude of the voltage supplied to the control unit of the host device is greater than a predetermined magnitude (first operation mode), a communication connection between the host device and the user terminal is maintained and the user terminal is charged, and when the magnitude of the voltage supplied to the control unit of the host device is smaller than the predetermined magnitude (second operation mode), a communication connection state is maintained and the user terminal is charged in a state in which the operation of the control unit of the host device is interrupted.

However, in the Korean Patent Publication, when the user terminal is connected to the host, in addition to a function of charging, a function of controlling internal operations of a flash storage included in the user terminal to be efficiently performed is not disclosed.

DISCLOSURE

Technical Problem

The present document is directed to providing a flash storage device that recognizes a connection state of an external power supply and controls an execution of an internal operation, thereby securing data reliability and preventing performance degradation due to the internal operation when a user requests a read/write operation.

Technical Solution

The present document is directed to providing an operation method of a flash storage device for maintaining data reliability and performance, and providing a mobile terminal provided with the flash storage device including a controller, and the controller may control an internal operation of the flash storage device by distinguishing a supply of internal power provided in the mobile terminal from a supply of external power.

In the conventional flash storage device, since an internal operation is performed without distinguishing a power supply type, an internal power supply may be consumed, so that the internal operation is restrictedly performed. However, according to the present invention, an internal operation may be performed when an external power supply is connected, and only power is supplied from an interface connected to a flash storage device and the connected interface is disabled by a user to further perform the internal operation, thereby securing data reliability and performance.

Advantageous Effects

In the present invention, a flash storage device can recognize an external power supply when the flash storage device or a mobile terminal equipped with the flash storage device is connected to the external power supply, and perform an internal operation in advance in an interface disabled state (a power-off state in which the mobile product is not in use or an interface connected to the flash storage device is blocked) or a standby mode (the state in which power is on but there is no user request) period to secure data reliability by rewriting, and perform a read/write operation according to a user's request due to a reduced internal operation to secure the user performance even in the read/write operation according to the user request.

MODES OF THE INVENTION

Hereinafter, the present invention will be described in detail so that those skilled in the art can easily understand and reproduce the present invention through the preferred embodiments described with reference to the accompanying drawings. In the following description of the present invention, when it is determined that detailed descriptions of related well-known functions or configurations unnecessarily obscure the gist of the embodiments of the present invention, the detailed descriptions thereof will be omitted. Since terms used throughout the specification the present invention are defined in consideration of functions in the embodiments of the present invention and may be sufficiently modified according to the intentions of the user or operator and customs, such terms should be defined on the basis of contents throughout the present specification.

Further, the foregoing and additional aspects of the invention will be apparent through the following embodiments. While the configurations of the selectively described aspects or selectively described herein are shown in a single integrated configuration in the figures, it is understood that they may be freely combined between each other unless otherwise apparent to one of ordinary skill in the art unless otherwise described.

Therefore, the embodiments described herein and illustrated in the configuration of the present invention are only the most preferred embodiments and are not representative of the full the technical spirit of the present invention, so it should be understood that various changes and modifications may be made at the time f filing the present application.

Figure 1:
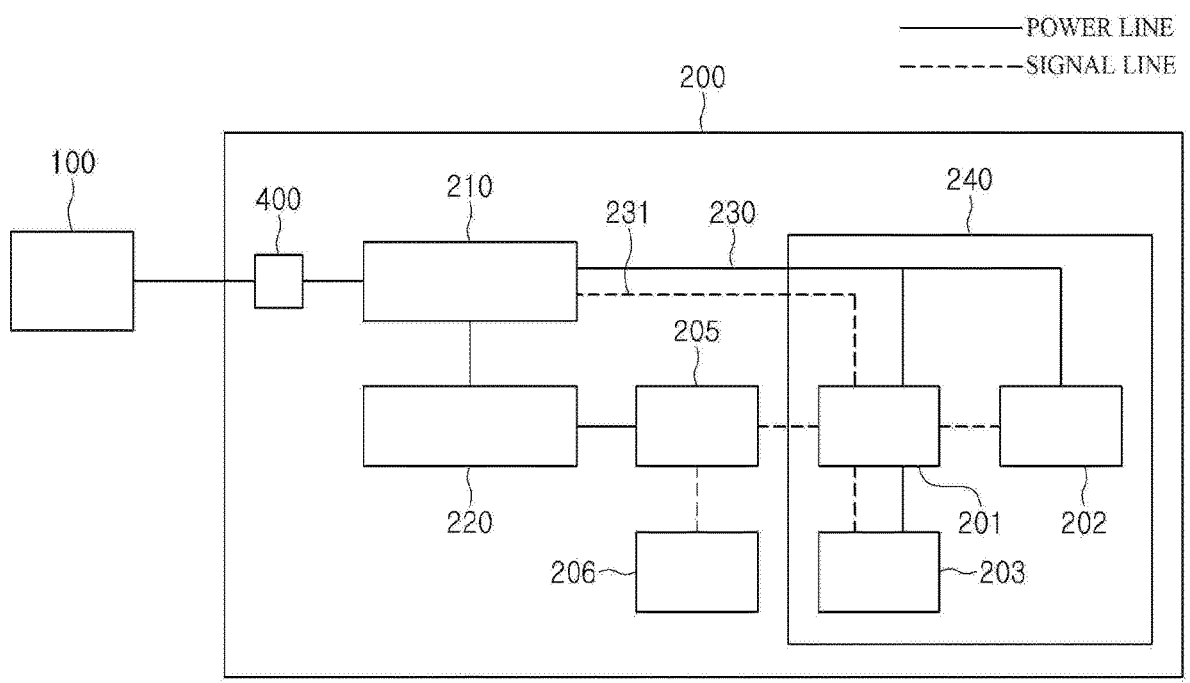
FIG. 1 is a view illustrating a mobile terminal provided with a flash storage device according to one embodiment.

FIG. 1 is a view illustrating a mobile terminal provided with a flash storage device according to one embodiment. As illustrated in the drawing, the mobile terminal is provided with the flash storage device.

The flash storage device includes a controller 201, and the controller may control internal operations of the flash storage device by distinguishing a supply of internal power provided in the mobile terminal from a supply of external power.

A mobile terminal 200 includes a flash storage device 240 configured to store data, and the flash storage device 240 includes a first controller 201 and a first memory 202 and may further include a second memory 203 depending on a product type. The flash storage device includes firmware for processing commands of a second controller, and the firmware is software that implements performance and data retention of the flash storage device 240 in addition to processing the commands of the second controller 205 and may reside in the first memory 202.

The mobile terminal 200 provided with the flash storage device 240 according to one embodiment may further include a power supply type detector 210 configured to detect power supply of an external power supply part 100 and provide power supply status information to the controller 201 when the power of the external power supply part 100 is supplied in a state in which an internal power supply part 220 provided in the mobile terminal is off. The power supply type detector 210 may be mounted outside the flash storage device 240. Further, the internal operations of the flash storage device may be controlled according to the power supply status information.

As illustrated in the drawing, a signal line 231 (dotted for transmitting a power supply type detection signal may be further included in addition to a power line 230 (solid line) of power supplied from the mobile terminal 200 to the flash storage device 240. The signal line 231 may be a transmission line configured to transmit the power supply type detection signal to the first controller 201 when the power supply type detector 210 detects that the external power supply part 100 is connected to an external power connection part 400.

The power supply type detection signal may be a signal transmitted regardless of an operation of the second controller 205. The detection of a power supply type by the power supply type detector 210 may be to distinguish whether the flash storage device 240 is connected to the external power supply part 100 of the mobile terminal or the internal power supply part 220 of the mobile terminal.

In the mobile terminal provided with the flash storage device according to one embodiment, the power supply type detector 210 may detect the supply of the external power and supply the power supply status information to the controller 201 when the external power is supplied in a state in which the internal power supply provided in the mobile terminal is on.

The flash storage device 240 may perform the internal operations according to the type of the power supply 100 or 220 to be supplied, and in this case, the flash storage device 240 may perform the internal operations in consideration of commands of the second controller 205, and perform the internal operations even in a state in which the second controller 205 is not connected thereto or in a period without the commands of the second controller 205. That is, the flash storage device 240 may perform the internal operations independently of the second controller. The state in which the second controller 205 is not connected to the flash storage device 240 may mean a time interval in which the user turns off a power switch of a mobile product and charges the internal power supply part 220 of the mobile product. The second controller 205 is a controller outside the flash storage device 240 and may be a central processing unit (CPU) mounted on the mobile terminal.

The internal operations may be operations autonomously performed by the first controller 201 in the flash storage device 240 by the firmware regardless of the commands of the second controller 205. Specifically, the firmware may perform an operation of rewriting data of the first memory 202 to maintain performance of the flash storage device and retain the stored data. The time during which the internal operations are performed may be changed and adjusted according to the state of the flash storage device 240.

The first memory 201 provided in the flash storage device 240 may be a NAND memory and the second memory 203 may be a dynamic random access memory (DRAM). Further, a third memory 206 provided outside the flash storage device 240 may be a DRAM.

The external power supply part 100 may supply the external power to the mobile terminal in a wired or wireless manner using a 60 Hz commercial power supply, a power supply of a personal computer (PC), or a power supply of a laptop computer. The mobile terminal 200 may be a smart-phone, a tablet PC, a laptop computer, or a product capable of operating with the internal power supply part 220 built in the product.

The mobile terminal provided with the flash storage device according to one embodiment may display execution and completion status information of the internal operations of the flash storage device on a display part (not shown) of the mobile terminal. Accordingly, the user may easily check the execution and completion status information of the internal operations through the display part of the mobile terminal.

Figure 2:
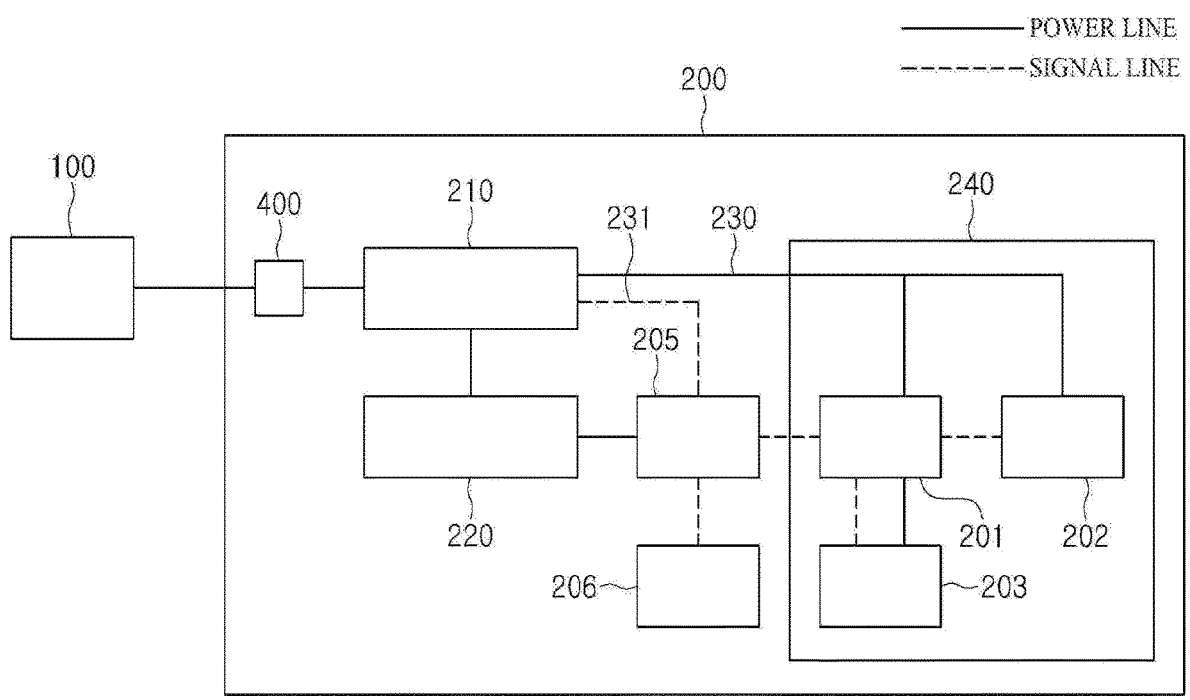
FIG. 2 is a view illustrating a mobile terminal provided with a flash storage device according to another embodiment.

FIG. 2 is a view illustrating a mobile terminal provided with a flash storage device according to another embodiment. As illustrated in the drawing, a mobile terminal 200 includes a flash storage device 240 configured to store data, and the flash storage device 240 includes a first controller 201 and a first memory 202 and may further include a second memory 203 depending on a product type. The flash storage device 240 includes firmware for processing commands of a second controller, and the firmware is software that implements performance and data retention of the flash storage device 240 in addition to processing the commands of the second controller 205 and may reside in the first memory 202.

As illustrated in the drawing, in the mobile terminal 200, a signal line 231 (dotted line) may be connected between a power supply type detector 210 and the second controller 205, and the signal line 231 (dotted line) may be connected between the first controller 201 and the second controller 205. Thus, the second controller 205 may receive a power supply type detection signal from the power supply type detector 210 and provide commands to the first controller 201.

The flash storage device 240 may perform the internal operations according to the commands transmitted from the second controller 205, and may distinguish a power supply type transmitted from the second controller 205 and perform the internal operations separately in a period without the commands. For example, when the flash storage device 240 is connected only to an internal power supply part 220, the internal operations may not be performed to prevent power consumption of the internal power supply part 220, and when the flash storage device 240 is connected to an external power supply part 100, the internal operations may be performed regardless of the power consumption.

The detection of the power supply type by the power supply type detector 210 may be to distinguish whether the flash storage device 240 is connected to the external power supply part 100 of the mobile terminal or the internal power supply part 220 of the mobile terminal.

The internal operations may be operations autonomously performed by the first controller 201 in the flash storage device 240 by the firmware. Specifically, the firmware may perform an operation of rewriting data stored in the first memory 202 to maintain performance of the flash storage device and retain the stored data. The time during which the internal operations are performed may be changed and adjusted according to the state of the flash storage device 240.

The first memory 201 provided in the flash storage device 240 may be a NAND memory and the second memory 203 may be a DRAM. In addition, a third memory 206 provided outside the flash storage device 240 may be a DRAM mounted in the mobile terminal 200.

The external power supply part 100 may supply the external power to the mobile terminal in a wired or wireless manner using a 60 Hz commercial power supply, a power supply of a PC, or a power supply of a laptop computer. The mobile terminal 200 may be a smart-phone, a tablet PC, a laptop computer, or a product capable of operating with the internal power supply part 220 built in the product.

Figure 3:
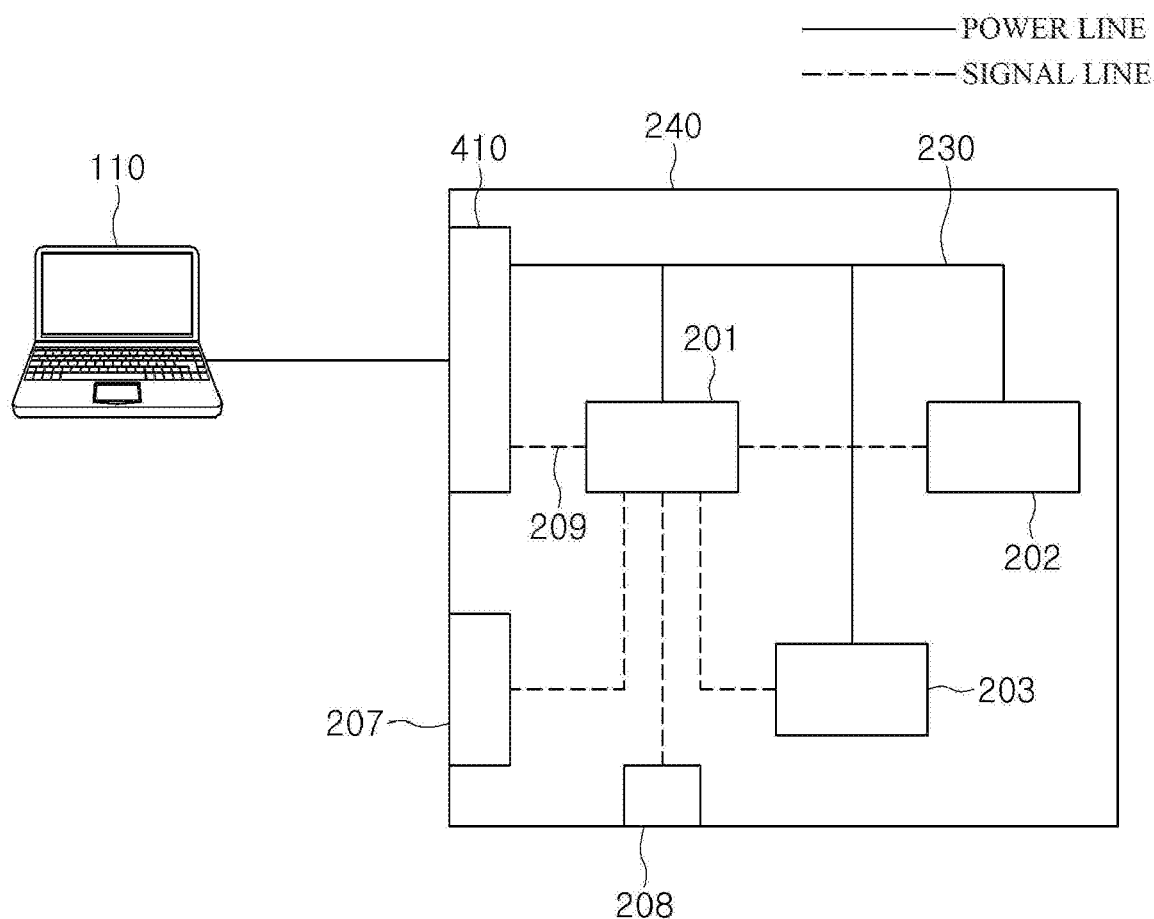
FIG. 3 is a view illustrating a flash storage device according to one embodiment.

FIG. 3 is a view illustrating a flash storage device according to one embodiment. A flash storage device 240 is illustrated in the drawing.

The flash storage device includes a controller 201, and when the flash storage device is connected to a host computer 110, the controller may receive only power from the host computer and perform internal operations in a state in which an interface for data communication is disabled.

The flash storage device 240 includes a first controller 201 and a first memory 202 and may further include a second memory 203 depending on a product type, the flash storage device includes firmware for processing commands of the host computer 110, and the firmware is software that performs internal operations for performance and data retention of the flash storage device 240 in addition to processing commands from the outside and may reside in the first memory 202. When the flash storage device is connected to the host computer 110 through a host computer connection part 410, the flash storage device receives power 230, and performs command processing of the host computer and the internal operations in a state in which an interface 209 for communication with the computer is enabled.

The flash storage device according to one embodiment may further include a switching part 207 operable by a user to disable the interface with the host computer 110. Further, the flash storage device according to one embodiment may further include a display part 208 connected to the controller 201 to allow the user to recognize an internal operation state of the flash storage device.

As illustrated in the drawing, the flash storage device 240 further includes the switching part 207 and the display part 208 to disable the connected interface 209 and perform the internal operations of the flash storage device 240 when the flash storage device 240 is connected to the host computer 110. The flash storage device 240 may disable interface 209 using a signal of the switching part 207, and the first controller may perform the internal operations in the state in which only the power is supplied and display the internal operation state on the display part 208. For example, the display part 208 may display a light-emitting diode (LED) in red while the internal operations are being performed, and may display the LED in green or turn off the LED when the internal operations are completed. Further, a sound using a speaker may be included to inform the internal operation state. The switching part 207 may be manually operated by the user in the flash storage device 240 so that the internal operations may be performed by the user's switching operation regardless of operations of the host corresponds. Thus, the interface 209 may be switched between enabled and disabled states by the operation of the switching part 207 of the user.

The internal operations may be internal operations autonomously performed by the first controller 201 in the flash storage device 240 by the firmware separately from the commands of the host computer 110. For example, the firmware may perform rewriting data of the first memory 202 to maintain performance of the flash storage device and retain the stored data, and the time during which the internal operations are performed may be changed depending on the state of the flash storage device 240.

The first memory 202 in the flash storage device 240 may be a NAND memory, and the host computer 110 includes, but is not limited to, a PC, a laptop, and a tablet PC.

The flash storage device 240 may include, but is not limited to, a Universal Serial Bus (USB) memory, a solid-state drive (SSD), an external storage device of a card, or a storage device built in a host computer.

Figure 4:
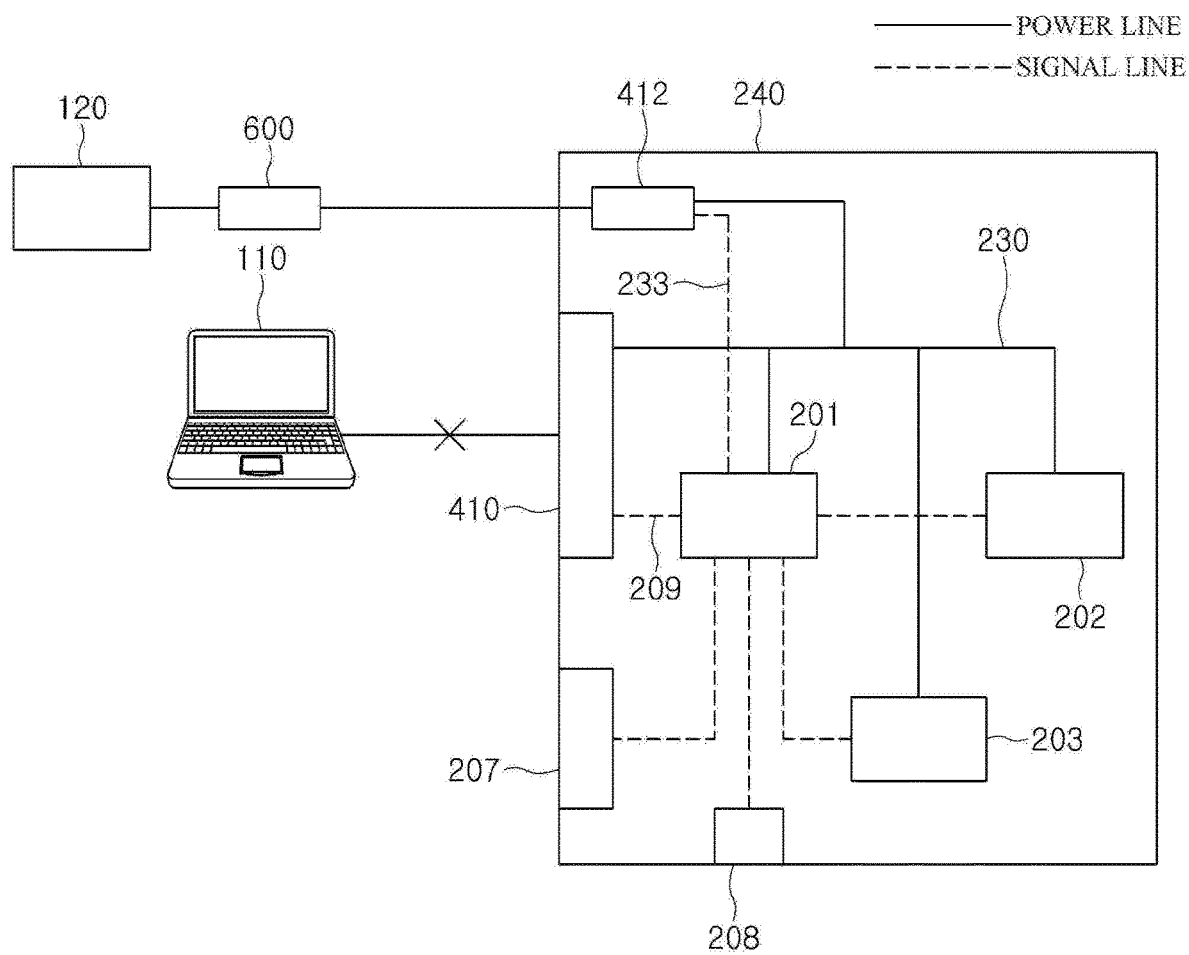
FIG. 4 is a view illustrating a flash storage device according to another embodiment.

FIG. 4 is a view illustrating a flash storage device according to another embodiment. As illustrated in the drawing, a flash storage device 240 includes a controller 201 and an adapter connection part connected to an adapter to receive power from an external 60 Hz commercial power supply part, and the controller 201 may control the flash storage device to perform internal operations when external power is supplied through the adapter connection part 412.

In order for the flash storage device 240 to be powered from an external 60 Hz commercial power supply 120 in addition to the host computer, the flash storage device 240 may further include an external power connection part 412 and an external power signal line 233 in addition to the host computer connection part 410 connected to the host computer 110. Accordingly, the external 60-Hz commercial power supply part 120 may be transformed to a certain voltage through an adapter 600, and only a voltage is supplied to the flash storage device. Thus, in the structure in which the external 60 Hz commercial power supply 120 is supplied through the adapter 600 without connection between the host computer connection part 410 and the adapter connection part 412, the first controller 201 may cause the flash storage device 240 to use a signal on the external power signal line 233 or to check the interface 209 of the external connection and then perform the internal operations in the state in which only the external 60 Hz commercial power supply is connected. The adapter connection part 412 may be additionally disposed in the vicinity of the host connection part 410 to prevent the connection part 412 and the host computer from being connected at the same time, and when the external 60 Hz commercial power supply 120 and the host computer 110 are connected at the same time, the flash storage device 240 may determine whether the internal operations are performed through the first controller 201 and the firmware that operates the first controller.

The internal operations may be internal operations autonomously performed by the controller 201 in the flash storage device 240 by the firmware separately from the commands of the host computer 110. For example, the firmware may perform rewriting data of the first memory 202 to maintain performance of the flash storage device and retain the stored data, and the time during which the internal operations are performed may be changed depending on the state of the flash storage device 240.

The flash storage device 240 may be a USB memory, an SSD, a card, or the like, but the present invention is not limited thereto.

The external 60 Hz commercial power supply 120 may refer to a 60 Hz commercial power supply of 110 V or 220 V, typically used in the home.

A display part which is connected to the controller to allow a user to recognize an execution and completion status of the internal operations of the flash storage device may be further included.

For example, a display part 208 may display an LED in red while the internal operations are being performed, and may display the LED in green or turn off the LED when the internal operations are completed. Further, a sound using a speaker may be included to inform the internal operation state.

The invention claimed is:

1. A flash storage device comprising:
   a NAND memory;
   a switching part manually operable by a user, the switching part being switched between an enabled state and a blocked state of an interface for data communication; and
   a controller electrically connected to the NAND memory, wherein
   the controller controls the flash storage device to perform an internal operation regardless of a power consumption in case that the flash storage device connects to a host computer and the switching part is switched to the blocked state of the interface for data communication,
   the internal operation is an operation of reclaiming a remaining garbage after files are deleted, and
   the host computer supplies an external power to the flash storage device.

2. The flash storage device of claim 1, further comprising a display part electrically connected to the controller to allow a user to recognize an internal operation state of the flash storage device.

3. The flash storage device of claim 1, further comprising:
   an adapter connection part electrically connected to an adapter to receive power from an external 60 Hz commercial power supply part,
   wherein the controller controls the flash storage device to perform the internal operation in case that external power is supplied through the adapter connection part.

\* \* \* \* \*